(12) United States Patent
Li

(10) Patent No.: US 8,325,811 B2
(45) Date of Patent: Dec. 4, 2012

(54) METHOD AND APPARATUS FOR MOTION COMPENSATED FRAME INTERPOLATION OF COVERED AND UNCOVERED AREAS

(75) Inventor: Yanxin Li, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 1594 days.

(21) Appl. No.: 11/557,920

(22) Filed: Nov. 8, 2006

(65) Prior Publication Data

US 2007/0121725 A1   May 31, 2007

(30) Foreign Application Priority Data

Nov. 8, 2005 (CN) .......................... 2005 1 0110112

(51) Int. Cl.
*H04N 7/12* (2006.01)

(52) U.S. Cl. ................................. 375/240.16

(58) Field of Classification Search .............. 375/240.16
See application file for complete search history.

(56) References Cited

U.S. PATENT DOCUMENTS 6,005,639 A * 12/1999 Thomas et al. ............... 348/699

FOREIGN PATENT DOCUMENTS

GB         2279531 A * 1/1995

* cited by examiner

*Primary Examiner* — Jayanti K. Patel
*Assistant Examiner* — Richard Torrente
(74) *Attorney, Agent, or Firm* — Marger Johnson & McCollom, P.C.

(57) ABSTRACT

We describe a motion compensated frame interpolation apparatus and method that includes a motion vector interpolation module for an object and uncovered area to generate information for motion vectors that cross interpolated pixels in object and/or uncovered areas. A motion vector interpolation module for a covered area generates information for motion vectors that cross interpolated pixels in covered areas. A motion vector counter records a number of motion vectors that cross an interpolated pixel. A buffer for motion vector interpolation buffers the information for motion vectors that cross interpolated pixels in the object and/or uncovered areas and the covered areas. And a video data interpolation module generates video data of the interpolated pixels in object and/or uncovered areas and the covered areas.

7 Claims, 4 Drawing Sheets

METHOD AND APPARATUS FOR MOTION COMPENSATED FRAME INTERPOLATION OF COVERED AND UNCOVERED AREAS

This application claims priority from Chinese patent application no. 2005 1 0110112.3 filed on Nov. 8, 2005, the disclosure of which we incorporate by reference.

FIELD

The present invention relates to an interpolation apparatus and method and, more particularly, to a motion compensated frame interpolation apparatus and method.

BACKGROUND

The scanning format of a television system largely determines the maximum spatial and dynamic resolution of an image displayed thereon. The resolution, in turn, has a major effect on the perceived image quality. One particular scanning format parameter, the frame rate or frequency, determines how well the television can display objects in motion. The field rate of an interlaced image is twice the effective frame rate, since interlacing draws only half of the image (the odd or even numbered lines) at a time. For an interlaced image, image quality depends on deinterlacing 50 and 60 Hz broadcast video signals.

An existing deinterlacing method uses a progressive scanning format and high scan rate to improve the image quality. One simple method for increasing scan rate is repeatedly displaying a previous frame saved in a buffer. The interpolated frame is then identical to the previous frame. While this approach works well for static or motionless images, it produces poor quality in dynamic or motion images that have frames continuously changing. For these images, repeatedly displaying the identical frame may produce undesirable artifacts including flickering, that tire the human eye. As television displays become larger, flickering artifacts become more noticeable.

Another existing deinterlacing method uses motion estimation compensation based on image segments to interpolate frames. This deinterlacing method improves flickering artifacts but cannot obtain motion vectors of covered or uncovered areas, and thus, it cannot improve frame interpolation in those areas. That is, motion estimation compensation cannot estimate and process the covered or uncovered areas well and, therefore, it cannot accurately interpolate frames that improve image quality.

SUMMARY

We describe a motion compensated frame interpolation apparatus and method that achieves discretionary frame interpolations at any time and effectively processes frame interpolation of uncovered areas.

We describe a motion compensated frame interpolation apparatus that includes a motion vector interpolation module for an object and uncovered area to generate information for motion vectors that cross interpolated pixels in object and/or uncovered areas. A motion vector interpolation module for a covered area, coupled to the motion vector interpolation module for the object and uncovered area, generates information for motion vectors that cross interpolated pixels in covered areas. A motion vector counter, coupled to the motion vector interpolation module for the object and uncovered areas and the motion vector interpolation module for the covered area, records a number of motion vectors that cross an interpolated pixel. A buffer for motion vector interpolation, coupled to the motion vector interpolation module for the object and uncovered areas and the motion vector interpolation module for the covered area, buffers the information for motion vectors that cross interpolated pixels in the object and/or uncovered areas and the covered areas. And a video data interpolation module, coupled to the motion vector counter 2 and the buffer for motion vector interpolation, generates video data of the interpolated pixels in object and/or uncovered areas and the covered areas.

We describe a motion compensated frame interpolation method that includes generating information for motion vectors that cross interpolated pixels in object and/or uncovered areas, generating information for motion vectors that cross interpolated pixels in covered areas, and counting a number of motion vectors that cross an interpolated pixel. And the method includes buffering the information for motion vectors that cross interpolated pixels in the object and/or uncovered areas and the covered areas and generating video data of the interpolated pixels in object and/or uncovered areas and the covered areas responsive to the buffered information for motion vectors.

BRIEF DRAWINGS DESCRIPTION

DETAILED DESCRIPTION

Figure 1:
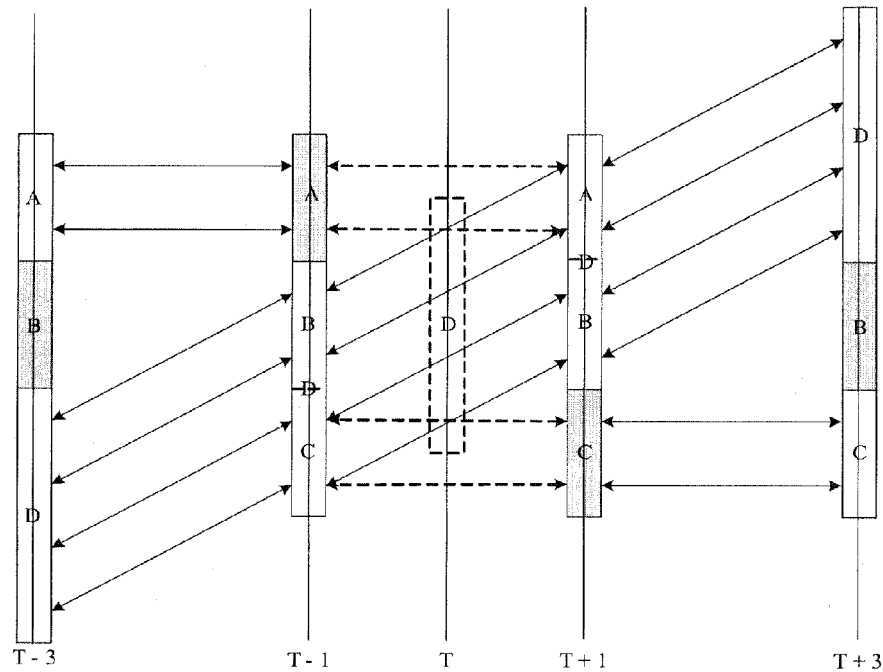
FIG. 1 is a diagram of an example motion compensated frame interpolation method.

FIG. 1 is a diagram of an example motion compensated frame interpolation method. In the description, we identify a covered area as a background area that may be present in a previous frame but "covered," overlaid, or otherwise replaced by a moving object in a future frame. An uncovered area is a background area that is covered by a moving object in a previous frame but "uncovered" in a future frame because of the moving object's movement.

Referring to FIG. 1, areas A, B, and C of a frame at T−3 are background areas of a moving object D. From time T−3 to T−1, area B becomes a covered area as the moving object D moves from area C (at T−1) to area B (at T−3). From time T−1 to T+1, area A becomes a covered area as moving object D moves from areas B and C (at T−1) to area A and B (at T+1). From time T−1 to T+1, area C becomes uncovered as moving object D moves from areas B and C (at T−1) to areas A and B (at T+1). From time T+1 to T+3, area B becomes uncovered as moving object D moves from areas A and B (at T+1) to area A (at T+3).

The motion vector in area A is unavailable to interpolate a frame at time T because area A at time T−1 is an uncovered area. But the motion vectors in area A from time T−1 to T+1 are available as area A goes from an uncovered area to a covered area. Assuming the background is still, the motion vector in area A from time T−1 to time T+1 is deemed equal to the vector from time T−3 to time T−1. And the motion vector in area C is unavailable at a time T, but the motion vector in area C from time T+1 to T+3 is available. Assuming the background is still, the motion vector in area C from time T−1 to T+1 is deemed equal to the vector from time T+1 to T+3.

Figure 2:
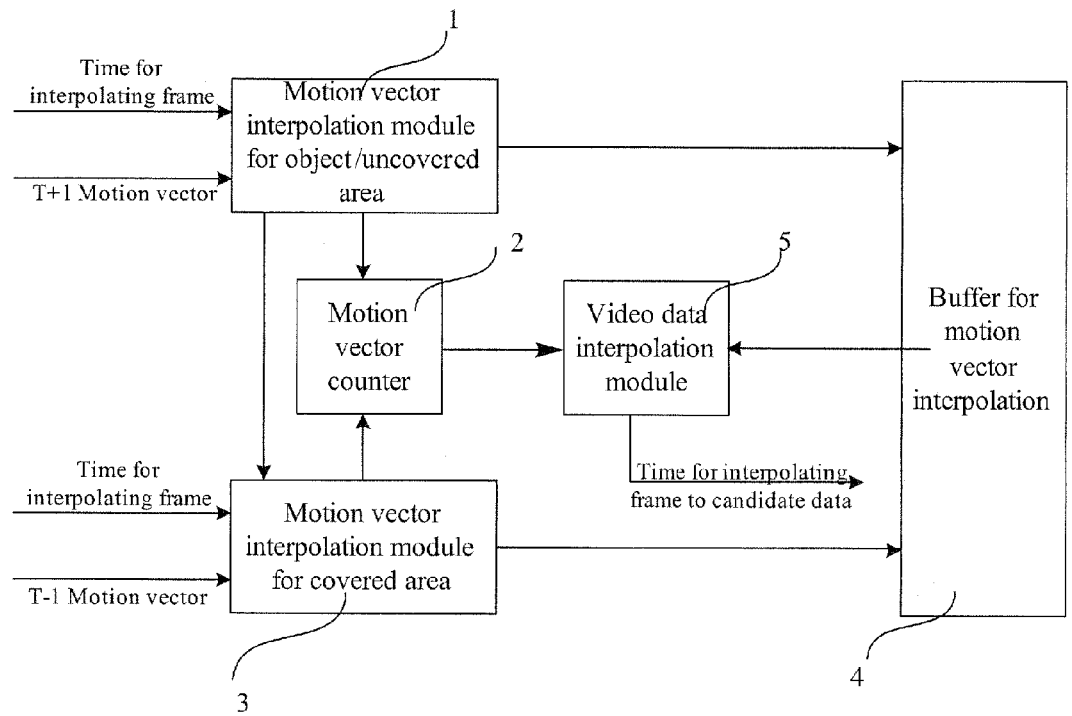
FIG. 2 is a block diagram of an example motion compensated frame interpolation apparatus.

FIG. 2 is a block diagram of an example motion compensated frame interpolation apparatus. Referring to FIG. 2, an example motion compensated frame interpolation apparatus includes a motion vector interpolation module for an object and an uncovered area 1, a motion vector counter 2, a motion vector interpolation module for a covered area 3, a buffer for motion vector interpolation 4, and a video data interpolation module 5. The motion vector interpolation module for an object and an uncovered area 1 is coupled to the motion vector interpolation module for a covered area 3, and both are coupled to the motion vector counter 2 and the buffer for motion vector interpolation 4. The motion vector counter 2 and the buffer 4 are coupled to the video data interpolation module 5.

The motion vector interpolation module for an object and an uncovered area 1 generates motion vectors for cross interpolated pixels in object areas (e.g., object D in FIG. 1) and in uncovered areas (e.g., area A at time T−1 in FIG. 1) responsive to a motion vector, e.g., T+1 motion vector, and a time for interpolating a frame. The motion vector interpolation module for a covered area 3 generates motion vectors which cross interpolated pixels in covered area responsive to a motion vector, e.g., T−1 motion vector, and a time for interpolating a frame. The motion vector counter 2 records a number of motion vectors that cross a same interpolated pixel responsive to outputs from the modules 1 and 3. The buffer for motion vector interpolation 4 buffers motion vectors that cross interpolated pixels in object, covered, and uncovered areas. The video data interpolation module 5 generates video data of interpolated pixels responsive to outputs from the motion vector counter 2 and the buffer 4.

Figure 3:
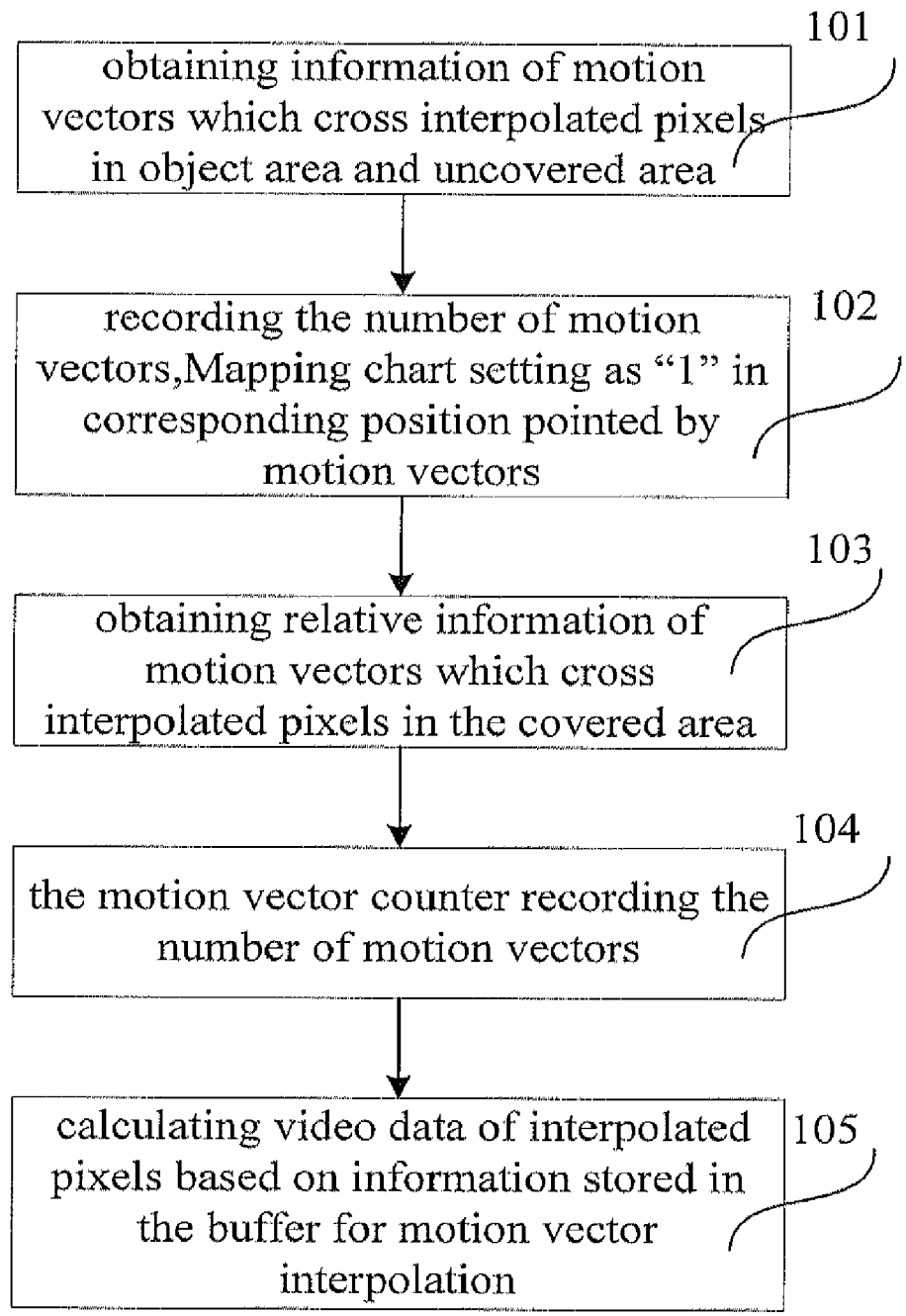
FIG. 3 is a flowchart of an example motion compensated frame interpolation method.

FIG. 3 is a flowchart of an example motion compensated frame interpolation method. Referring to FIG. 3, at 101, the method obtains motion vectors that cross interpolated pixels in object and uncovered areas and provides the motion vectors to the buffer 4. At 102, the method records the number of motion vectors crossing interpolated pixels in object and uncovered areas (determined at 101) in the motion vector counter 2. The method creates a chart that sets to 1 positions pointed by the motion vectors crossing interpolated pixels in object and uncovered areas (determined at 101). At 103, the method obtains motion vectors that cross interpolated pixels in covered areas and provides the motion vectors to the buffer 4. At 104, the motion vector counter 2 records the number of motion vectors crossing interpolated pixels in covered areas (determined at 103) in the motion vector counter 2. At 105, the method calculates interpolated pixels at the video data interpolation module 5 responsive to the motion vectors stored in buffer 4. By doing so, the method generates the interpolated pixels in the covered area.

Figure 4:
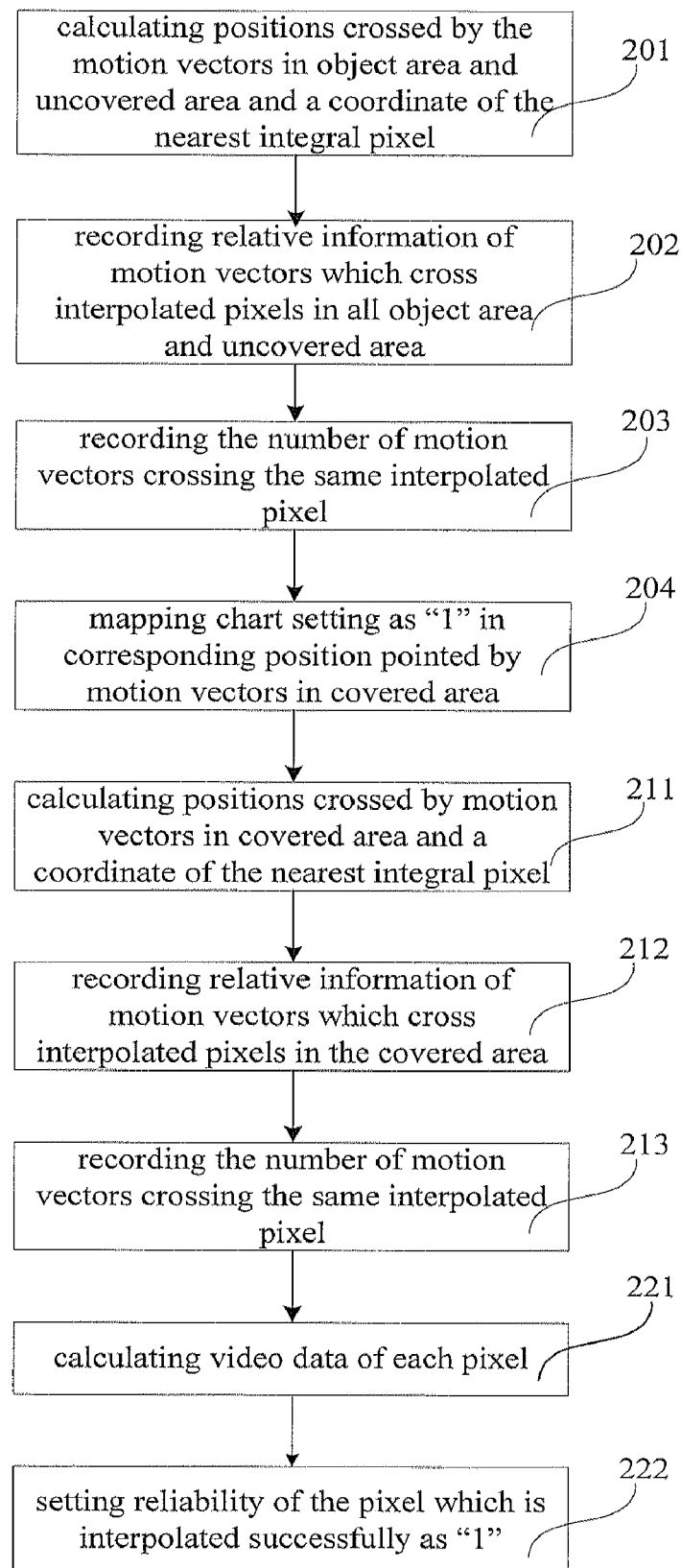
FIG. 4 is a flowchart of an example motion compensated frame interpolation method.

FIG. 4 is a flowchart of an example motion compensated frame interpolation method. Referring to FIG. 4, at step 201, the method calculates positions crossed by the motion vectors in object and uncovered areas and a coordinate of the nearest integral pixel responsive to the motion vectors at the next frame time T−1. The motion vector interpolation module for an object and an uncovered area 1 reads a time for interpolating a frame and motion vectors at next frame time T−1 following the time for interpolating frame. The module 1 calculates positions crossed by the motion vectors in object and uncovered areas responsive to the motion vectors at the next frame time.

The positions crossed by the motion vectors in object and uncovered areas is equal to the motion vectors formed from frame T+1 to frame T−1 multiplied by a time coefficient of frame interpolation. The time coefficient ranges from 0 to 1 responsive to the time of frame interpolation. The position of this time represents a coordinate of time for interpolating the frame, a non-integer coordinate. The time for interpolating the frame may be randomly selected from a search table. In theory, if the table register is infinity, interpolation in any time is achieved and inserting multiple frames between any two neighboring frames is achieved so as to improve the refresh ratio.

At 202, the method records relative information of motion vectors that cross interpolated pixels in all object and uncovered areas in e.g., counter 2 and/or buffer 4. The relative information may include a distance between an actual position crossed by the motion vector and the nearest integral pixel, the type of area (object, covered, or uncovered area) located by the motion vector and a start position and an end position of the motion vector. The video data interpolation module 5 may use the relative information to calculate the pixels inserted in frames.

At 203, the method records the number of motion vectors that cross the same interpolated pixel.

At 204, the method sets to 1 positions pointed by the motion vectors in covered areas to show the moving vectors' end position at time T−1 (next frame time after time of interpolated frame) in a chart. If the pixel at time T−1 is not hit by the motion vector at time T+1, the pixel belongs to the covered area to be processed in the future.

At 211, the method obtains a time for interpolating the frame and motion vectors with a 1 setting in the chart that occurred at the previous frame time prior to the time for interpolating the frame and calculates positions crossed by the motion vectors in covered areas and a coordinate of the nearest integral pixel responsive to the motion vectors at the previous time frame.

The positions crossed by the motion vectors in the covered area is equal to−(motion vectors from frame at time T−1 to frame at time T−1) multiplied by (1−a time coefficient of frame interpolation). The time coefficient ranges from 0 to 1 responsive to the time of frame interpolation. The position of this time represents a coordinate of time for interpolating the frame, a non-integer coordinate.

At 212, the method records relative information of all motion vectors that cross interpolated pixels in the covered area in the buffer 4. The relative information may include a distance between an actual position crossed by the motion vector and the nearest integral pixel, the type of area (object, covered, or uncovered area) located by the motion vector and a start position and an end position of the motion vector. The method may use the relative information to calculate the video data of the interpolated frame (at 213).

At 213, the method records the number of motion vectors crossing the same interpolated pixels at, e.g., the motion vector counter 2.

At 221, the method calculates the video data for each pixel at, e.g., the video data interpolation module 5, responsive to the motion vectors' relative information stored in buffer 4. Many methods exist to calculate the video data including the method shown in the flowchart of FIG. 5 that we explain below. Any method known to a person of reasonable skill in the art comes within the scope of the claims.

Figure 5:
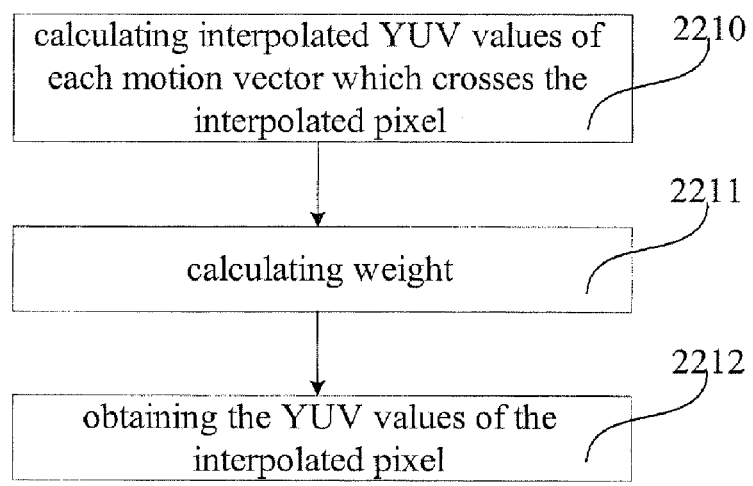
FIG. 5 is a flowchart of an example motion calculation method.

Referring to FIG. 5, at 2210, the method calculates YUV values for each motion vector that crosses the interpolated pixels. Different interpolation methods may be used depending on whether the area is an object, covered, or uncovered area. An example method is as follows. In an object area, the YUV values for interpolated pixels=(YUV values at time T+1+YUV values at time T−1). In an uncovered area, the YUV values for interpolated pixels=YUV values at time T+1. In a covered area, the YUV values for interpolated pixels=YUV values at time T−1.

Figure 6:
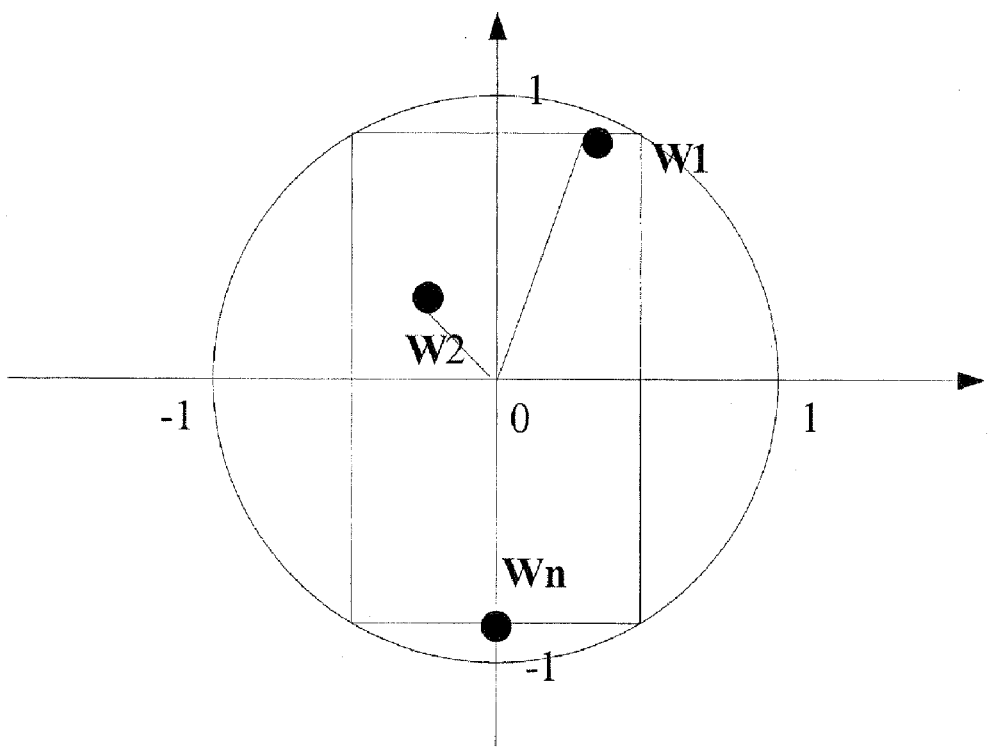
FIG. 6 is a diagram of an example motion calculation method.

At 2211, the method calculates a weight based on distance between an actual position crossed by the motion vector and the nearest integral pixel as shown in FIG. 6 as follows.

$$DSum = D1 + D2 + \ldots + DN$$

$$W1 = (1-D1)/(N-DSum)$$

$$W2 = (1-D2)/(N-DSum)$$

$$\ldots$$

$$Wn = (1-Dn)/(N-DSum)$$

Where N is the number of vectors crossing the pixel recorded by recorder, W1, W2, . . . , Wn are the weights of each vector, D1, D2, . . . , Dn is the distance between position crossed by each motion vector and integral point, and DSum denotes sum of those distances.

Returning to FIG. 5, at 2212, the method calculates the YUV values of the interpolated pixel as W1*YUV1+W2*YUV2+ . . . +Wn*YUVn.

Returning to FIG. 4, at 222, the method sets the reliability of the pixel that is successfully interpolated to 1 by the video data interpolation module 5. The reliability indicates that the method successfully interpolated the corresponding pixel.

We describe a motion compensated frame interpolation apparatus and method that interpolates frames at discretionary times, i.e., interpolates multiple frames between two neighboring frames so as to increase the refresh ratio and interpolates frames for covered areas.

The example embodiments we describe above are only to explain, but not to limit the present. Various modifications, changes, or equivalent replacements can be made by those skilled in the art without departing from the spirit and scope of the following claims despite the detailed description that refers to example embodiments.

I claim:

1. An apparatus, comprising:
a motion vector interpolation module for an object and uncovered area to generate information for motion vectors that cross interpolated pixels in object and/or uncovered areas, determine a time for interpolating a frame, determine the motion vectors in a next frame following the time for interpolating the frame, calculate positions crossed by the motion vectors in the object and/or uncovered areas and calculate a coordinate of a nearest integral pixel responsive to the motion vectors at the next frame time, and record relative information of the motion vectors that cross interpolated pixels in the object and/or uncovered areas;
a motion vector interpolation module for a covered area coupled to the motion vector interpolation module for the object and uncovered area to generate information for motion vectors that cross interpolated pixels in covered areas;
a motion vector counter coupled to the motion vector interpolation module for the object and uncovered areas and the motion vector interpolation module for the covered area to record a number of motion vectors that cross an interpolated pixel;
a buffer for motion vector interpolation coupled to the motion vector interpolation module for the object and uncovered areas and the motion vector interpolation module for the covered area to buffer the information for motion vectors that cross interpolated pixels in the object and/or uncovered areas and the covered areas; and
a video data interpolation module coupled to the motion vector counter and the buffer for motion vector interpolation to generate video data of the interpolated pixels in object and/or uncovered areas and the covered areas by performing the following:
calculating video data of each pixel responsive to the buffered information for motion vectors; and
setting a reliability of the pixel responsive to the calculating the video data of each pixel.

2. A method comprising:
a motion vector interpolation module generating information for motion vectors that cross interpolated pixels in object and/or uncovered areas;
the motion vector interpolation module generating information for motion vectors that cross interpolated pixels in covered areas;
a motion vector counter counting a number of motion vectors that cross an interpolated pixel;
a buffer buffering the information for motion vectors that cross interpolated pixels in the object and/or uncovered areas and the covered areas;
a video data interpolation module generating video data of the interpolated pixels in object and/or uncovered areas and the covered areas responsive to the buffered information for motion vectors, where said generating comprising:
calculating video data of each pixel responsive to the buffered information for motion vectors; and
setting a reliability of the pixel responsive to the calculating the video data of each pixel;
determining a time for interpolating a frame;
determining the motion vectors in a next frame following the time for interpolating the frame:
calculating positions crossed by the motion vectors in the object and/or uncovered areas and calculating a coordinate of a nearest integral pixel responsive to the motion vectors at the next frame time; and
recording relative information of the motion vectors that cross interpolated pixels in the object and/or uncovered areas.

3. The method of claim 2 comprising:
creating a chart; and
setting a first value in a first position in the chart, the first position being pointed to by the motion vectors that cross the interpolated pixels in the covered area.

4. The method of claim 3 comprising:
determining a time for interpolating a frame;
setting the first value in a second position in the chart, the second position being pointed to by the motion vectors that cross the interpolated pixels in the covered area at a previous frame at a time prior to the time for interpolating the frame;
calculating positions crossed by the motion vectors in the covered area and calculating a coordinate of a nearest integral pixel responsive to the motion vectors at the previous frame time;
recording relative information of the motion vectors that cross interpolated pixels in the covered areas.

5. The method of claim 4 where recording relative information includes:
recording a distance between an actual position crossed by the motion vectors that cross interpolated pixels in the covered areas and the nearest integral pixel;

recording a type of area located by the motion vectors that cross interpolated pixels in the covered areas; and recording a start position and an end position of the motion vectors that cross interpolated pixels in the covered areas.

6. The method of claim 2 where calculating the video data of each pixel includes:
- calculating YUV values of each motion vector that crosses the interpolated pixel;
- calculating a weight for each motion vector responsive to a distance between an actual position crossed by the motion vector and a nearest integral pixel; and
- calculating the YUV values of the interpolated pixel responsive to the YUV values and the weight of each motion vector.

7. The method of claim 2 where recording relative information includes:
- recording a distance between an actual position crossed by the motion vectors that cross interpolated pixels in the object and/or uncovered areas and the nearest integral pixel;
- recording a type of area located by the motion vectors that cross interpolated pixels in the object and/or uncovered areas; and
- recording a start position and an end position of the motion vectors that cross interpolated pixels in the object and/or uncovered areas.

* * * * *